(12) United States Patent
Gehlen et al.

(10) Patent No.: US 8,831,604 B2
(45) Date of Patent: Sep. 9, 2014

(54) LOCALIZED INFORMATION SERVICE FOR CELLULAR NETWORKS USING MULTICAST CHANNELS

(75) Inventors: Guido Gehlen, Neuss (DE); Gordian Jodlauk, Würselen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 376 days.

(21) Appl. No.: 13/391,003

(22) PCT Filed: Aug. 25, 2009

(86) PCT No.: PCT/EP2009/060916
§ 371 (c)(1),
(2), (4) Date: Apr. 27, 2012

(87) PCT Pub. No.: WO2011/023221
PCT Pub. Date: Mar. 3, 2011

(65) Prior Publication Data
US 2012/0202495 A1    Aug. 9, 2012

(51) Int. Cl.
| | | |
|---|---|---|
| *H04W 4/00* | (2009.01) | |
| *H04W 4/22* | (2009.01) | |
| *H04L 29/08* | (2006.01) | |
| *H04L 12/18* | (2006.01) | |
| *H04W 4/02* | (2009.01) | |
| *G08G 1/0967* | (2006.01) | |
| *H04W 4/04* | (2009.01) | |
| *H04W 4/12* | (2009.01) | |
| *G08G 1/16* | (2006.01) | |
| *H04L 12/58* | (2006.01) | |

(52) U.S. Cl.
CPC ............ *G08G 1/164* (2013.01); *H04W 4/22* (2013.01); *H04L 67/18* (2013.01); *H04L 12/189* (2013.01); *H04L 12/5895* (2013.01); *H04W 4/02* (2013.01); *H04L 12/185* (2013.01); *H04L 67/16* (2013.01); *H04W 4/021* (2013.01); *G08G 1/096783* (2013.01); *H04W 4/046* (2013.01); *H04W 4/12* (2013.01)
USPC ............. 455/435.1; 455/404.1; 455/404.2; 455/456.1; 370/328

(58) Field of Classification Search
CPC ......... H04W 4/22; H04W 8/04; H04W 60/02; H04W 60/06
USPC ............. 455/404.1, 404.2, 435.1, 456.1; 370/328
See application file for complete search history.

(56) References Cited

U.S. PATENT DOCUMENTS 6,002,748 A * 12/1999 Leichner ................... 379/48
6,112,074 A *  8/2000 Pinder ..................... 455/404.2
(Continued)

FOREIGN PATENT DOCUMENTS

| DE | 102005061419 A1 | 7/2007 |
|---|---|---|
| DE | 102008015232 A1 | 5/2009 |
| EP | 1981182 A1 | 10/2008 |

OTHER PUBLICATIONS

Suds S. et al., "Enabling Rapid Wireless System Composition Through Layer-2 Discovery", IEEE Network IEEE Service Center, New York, NY, US Linkd-DOI:10.1109/MNET.2008.4579766, vol. 22, No. 4, Jul. 1, 2008, pp. 14-20, XP011232023 ISSN: 0890-8044 abstract.

(Continued)

*Primary Examiner* — Amancio Gonzalez
(74) *Attorney, Agent, or Firm* — Coats & Bennett, PLLC

(57) ABSTRACT

A system Is proposed for providing a localized information service using an infrastructure of a cellular communication network, the system comprising: a service source terminal arranged for transmitting a network upload message to the cellular communication network, said network upload message comprising a payload part; and a reflection entity of said cellular communication network arranged for receiving said network upload message, for generating one or more reflection messages comprising said payload part, and for sending said one or more reflection messages to at least one service destination terminal that has a predetermined spatial relationship with said service source terminal, wherein a spatial zone is defined and the system is arranged for automatically operating in a connected mode of the cellular communication network at least one of the service source terminal and the at least one service destination terminal that is inside the spatial zone.

32 Claims, 7 Drawing Sheets

(56) References Cited

U.S. PATENT DOCUMENTS

| | | | |
|---|---|---|---|
| 6,463,273 B1 * | 10/2002 | Day | 455/404.1 |
| 6,745,021 B1 * | 6/2004 | Stevens | 455/404.1 |
| 7,907,930 B2 * | 3/2011 | Grevers, Jr. | 455/404.1 |
| 8,165,577 B2 * | 4/2012 | Chang et al. | 455/423 |
| 8,467,792 B2 * | 6/2013 | Flore et al. | 455/439 |
| 8,606,293 B2 * | 12/2013 | Kim et al. | 455/456.1 |
| 2002/0019228 A1 * | 2/2002 | McKenna et al. | 455/435 |
| 2007/0264991 A1 | 11/2007 | Jones et al. | |
| 2010/0042696 A1 * | 2/2010 | Vella et al. | 709/206 |

OTHER PUBLICATIONS

"3rd Generation Partnership Project; Technical Specification Group Services and Architecture; Multimedia Broadcast/Multicast Service (MBMS); Architecture and Functional Description (Release 9)"; 3GPP Standard; 3GPP TS 23.245, 3rd Generation Partnership Project (3GPP), Mobile Competence Centre; 650 Route Des Lucioles; F-06921 Sophia-Antipolis Cedex; France, No. V9.1.0, Jun. 1, 2009, pp. 1-61 XP05036428 (whole document).

* cited by examiner

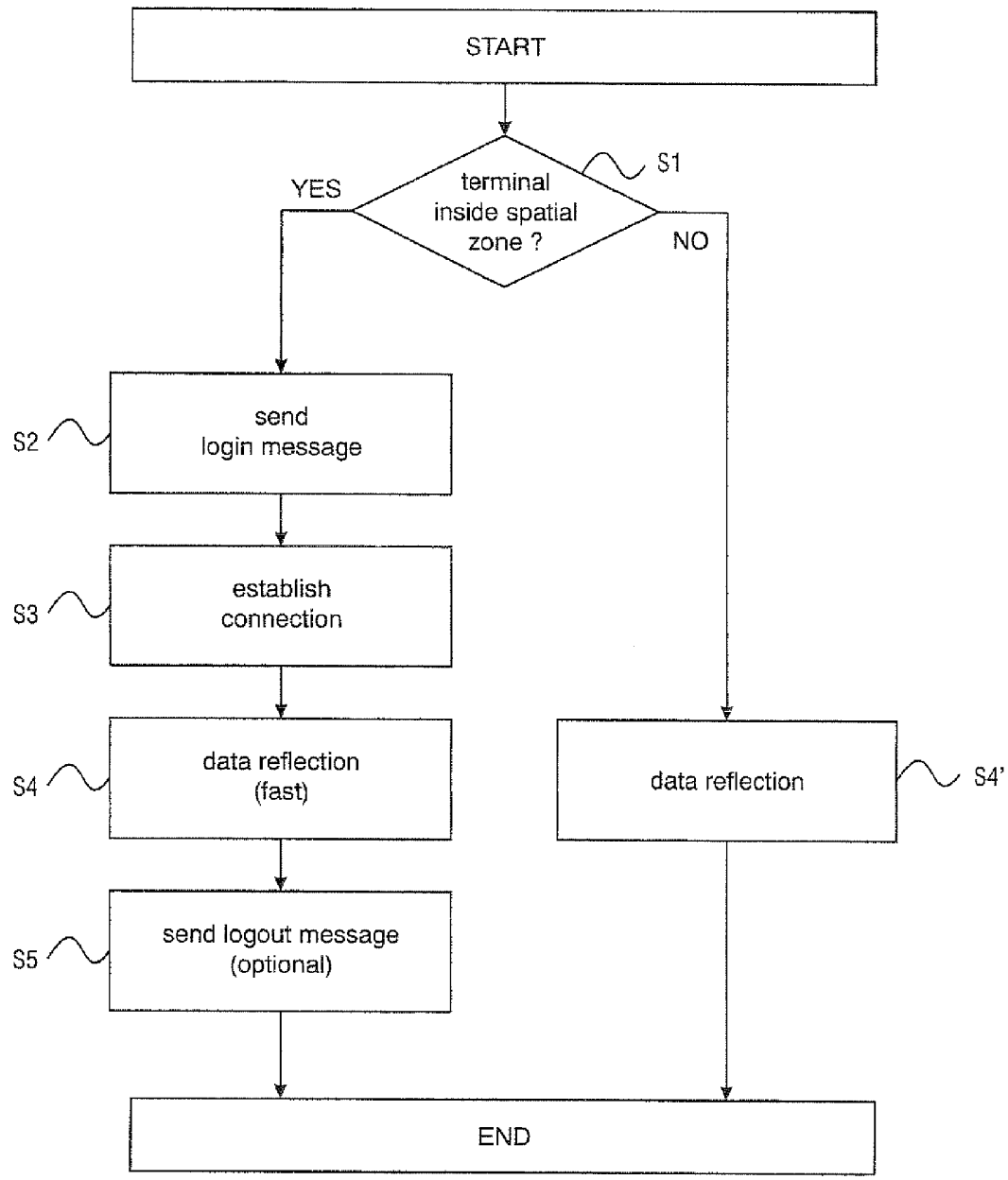

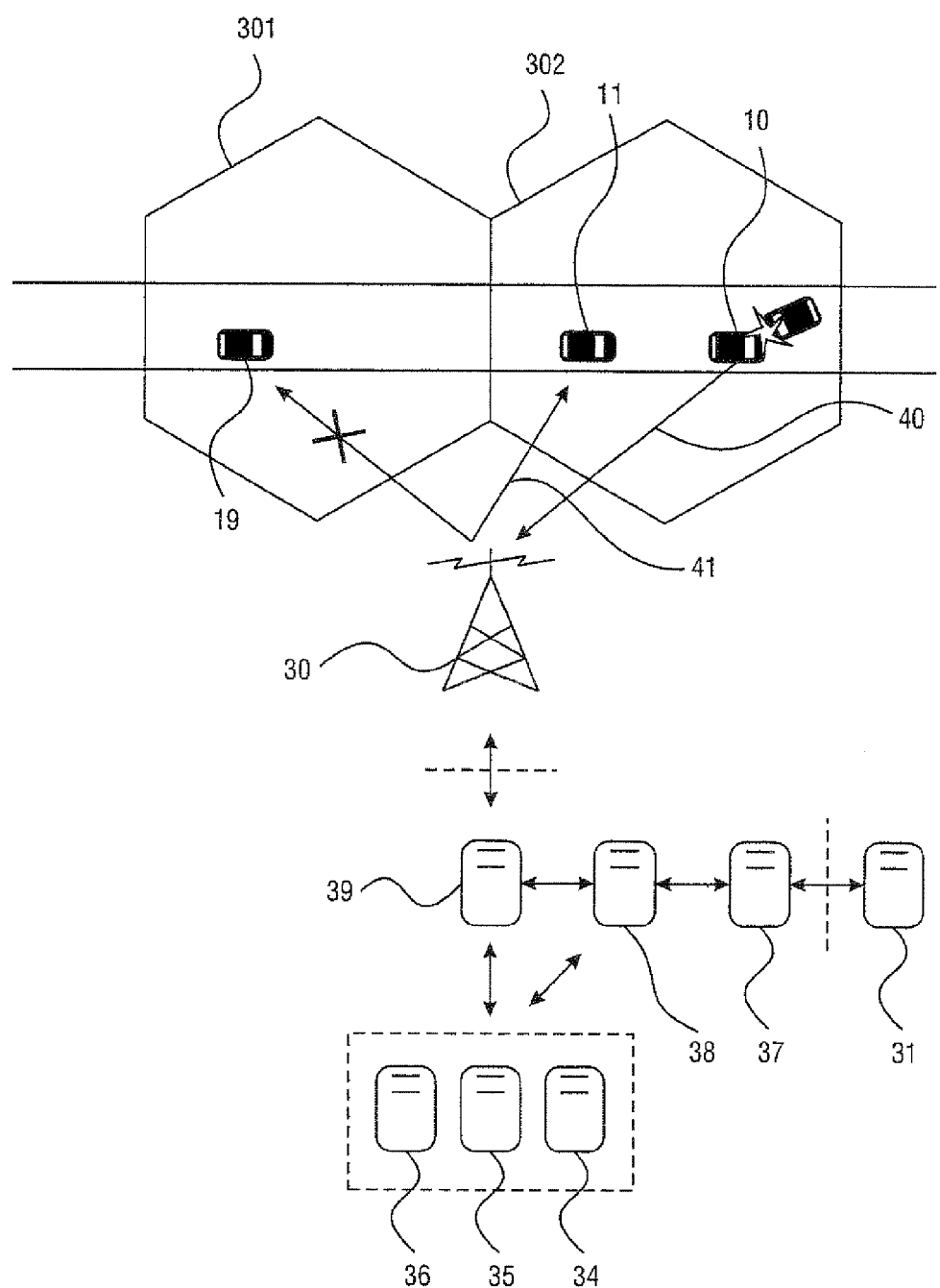

LOCALIZED INFORMATION SERVICE FOR CELLULAR NETWORKS USING MULTICAST CHANNELS

TECHNICAL FIELD

The present invention relates to a system for providing a localized information service using an infrastructure of a cellular communication network, to a method for operating a system that provides a localized information service using an infrastructure of a cellular communication network, to a network entity of a cellular communication network, and to a method of controlling such a network entity.

BACKGROUND

It is known to provide so-called Location Based Services (LBS) in cellular communication networks, such as cellular wireless telephone networks. Such services typically comprise mechanisms for estimating the location of a terminal, e.g. with the help of a Global Positioning System (GPS) or a Mobile Positioning System (MPS) that may use Cell-ID information or algorithms based on timing advances and for a triangulation for determining the position of a terminal. Based on the knowledge of the terminal's location, specific location based services can be offered to said terminal, e.g. alert messages for upcoming road traffic hazards or indications toward deviations to avoid traffic jams.

It is furthermore known to broadcast information with the help of so-called Cell Broadcast Services (CBS), in order to distribute information to terminals within one or more cells. The respective terminals have to enable the listening of the respective broadcast channel. A so-called Multimedia Broadcast and Multi-Cast Service (MEMS) is known that provides a broadband broadcast to mobile terminals. On an application layer, a file transmission using e.g. FLUTE (File Delivery over Unidirectional Transport) or a streaming transmission using RTP (Real Time Transport Protocol) may be used to transmit content to terminals.

Furthermore, emergency services are known, in which upon receiving an emergency message from a mobile terminal, a determination of the location of said terminal is made, in order to e.g. be able to send help to that location, for example in the form of an ambulance.

SUMMARY

The object of the present invention is to provide an improved location based service using an infrastructure of a cellular communication network, such as a cellular wireless telephone network. In particular, it is an object of the present invention to provide faster distribution of respective messages to service destination terminals such that these terminals receive the respective messages faster, while avoiding a possible over-load to the communications network as a whole.

This object is achieved by the subject-matter of the independent claims. Preferred embodiments are described in the dependent claims.

According to an embodiment of the invention, a system is proposed for providing a localized information service using an infrastructure of a cellular communication network, the system comprising a service source terminal arranged for transmitting a network upload message to the cellular communication network, said network upload message comprising a payload part, and a reflection entity of said cellular communication network arranged for receiving said network upload message, for generating one or more reflection messages comprising said payload part, and for sending said one or more reflection messages to at least one service destination terminal that has a predetermined spatial relationship with said service source terminal, wherein a spatial zone is defined and the system is arranged for automatically operating in a connected mode of the cellular communication network at least one of the service source terminal and the at least one service destination terminal that is inside the spatial zone.

Thus, a fast concept of data reflection is provided by the present invention. Namely, a source terminal sends specific content in a payload part of a network upload message. The network upload message is a message that does not contain destination addresses of other terminals (such as e.g. would be the case in an SMS or MMS). The network upload message is, however, arranged such that it can be recognized as such, i.e. as a message for being reflected, for example by carrying or lacking a predetermined piece of information.

Within the network a reflection entity is provided which is arranged for recognizing the network upload message. The reflection entity "reflects" the content in the payload part by simply placing it into messages that are destined for at least one service destination terminal that has a predetermined spatial relationship with the terminal that sent the upload network message (the service source terminal).

The predetermined spatial relationship can be determined explicitly by the reflection entity, e.g. by determining the location of the service source terminal that transmitted the network upload message and then determining destination terminals that, e.g. are within a predetermined distance of said service source terminal, or the spatial relationship can be established implicitly, e.g. by virtue of the position of the reflection entity itself, which can for example be associated with a network base station and arranged for sending the reflection message to all terminals with the coverage area of said base station.

In other words, the concept of data reflection renders it possible to distribute information to a spatially restricted number of terminals while requiring only very little processing resources, because the content in the payload part is reflected and not processed further within the communication network. In this way, a localized information service can be provided in which certain service source terminals (which can preferably also at the same time act as service destination terminals) can trigger an information flow by sending an upload message which is then promptly reflected by the reflection entity to a spatially limited group of service destination terminals.

Further, a spatial zone is defined independently from the predetermined spatial relationship. The system for providing the localized information service is arranged for automatically operating in a connected mode of a cellular communication network at least one terminal that is inside this spatial zone. In this way, the service source terminal from which the network upload message originated that is inside the spatial zone and/or at least one service destination terminal that is inside the spatial zone are automatically operated in a connected mode of the cellular communication network.

Operating said terminals in said connected mode implies that no connection mode has to be established anymore at the instance when the service source terminal is about to transmit the network upload message and/or the reflection entity is about to send the one or more reflection messages to the at least one service destination terminal. This can avoid further delay when the respective service terminals are already inside the spatial zone, and, therefore, already operated in a connected mode. Since the time that is required for establishing a connection between a respective terminal and the reflection entity, i.e. channel setup and/or resource allocation, can be avoided in these instances, substantial time is saved and the delay after which the service destination terminals receive the reflection message is substantially reduced.

Even though keeping some services terminals, i.e. the terminals that are inside the spatial zone, in said connected mode may require a localized increased load to radio and processing resources of the cellular communications network, an overload of the network as a whole is avoided by means of defining the spatial zones. Restricting the automatic operation of service terminals in said connected mode to the spatial zones provides, on the one hand, an enhanced quality of service for the terminals in the spatial zone, and, on the other hand, avoids network overload as a whole, since no additional resources are required outside the spatial zones.

On the contrary, simply extending the concept of data reflection by operating all terminals in the connected mode would inevitably pose a heavy load to all involved network entities and resources, as well as it would block other services from working satisfactorily. In other words, extra fast distribution of information is provided only to a number of terminals that are more likely to transmit or receive a reflected message, and for these terminals increased radio and processing resources are provided in correspondingly restricted areas.

The above-described concept of fast data reflection can be of particular advantage in case of messages that warn service destination terminals of time-critical events, such as upcoming road traffic hazards. Such messages are particularly time-critical, since the service destination terminal may be moving fast toward the location of said road traffic hazard, which may coincide with the location of the service source terminal that has sent the network upload message. In such situations, all system inherent delay may result in a substantial loss of usability of data reflection, since every second counts for, e.g., reducing speed in time or still being able to catch an exit in order to circumvent the upcoming road hazard. Road traffic hazards, for example, include traffic jams, trails of traffic jams, incidents, road blocks, localized extreme weather conditions, such as thunderstorms, hailstorms, tornados, or slippery road conditions.

By means of operating at least one of the service source terminal and the at least one of the service destination terminals automatically in a connected mode of the communication network, it can be ensured that the service source terminal and/or the service destination terminal is in a connected mode prior to either transmitting the network upload message or, respectively, receiving the reflection message if inside the spatial zone.

In general, the service source terminal and the service destination terminal may be identical or similar units, such as mobile phones, hand-held mobile devices, Personal Digital Assistants (PDA), mobile positioning systems such as hand-held GPS, Glonass, or Galileo devices. They can be, however, also vehicle mounted devices, such as navigation systems, vehicle mounted mobile phones, vehicle mount traffic alert systems, and the like. Further the terminals may comprise modules and/or components according to and/or complying with the Global System of Mobile Communications (GSM), General Packet Radio Service (CPRS), Enhanced Data Rates for GSM Evolution (EDGE), Universal Mobile Telecommunications System (UMTS), High Speed Packet Access (HSPA), 3GPP Long Term Evolution (LTE), Cell-ID transmission, Multimedia Broadcast Multicast Service (MEMS), Location Based Services (LBS). Further, the terminals may comprise a GPS-, Glonass-, or Galileo-module, various sensors to detect hazardous situations such as incidents, traffic jams or extreme weather conditions, display or speaker means for informing users about incoming warnings in form of reflection messages, and/or means for storing a digital map to determine spatial zones. In addition to the above, the service source and/or destination terminal may also be or be part of a vehicle integrated system, such as a so-called eCall (emergency call) device.

The spatial zone can be any area that can be spatially defined, such as a geographically defined zone or zones that are defined by means of service quality levels, such as areas in which signals from a mobile communication network can be received at a predetermined minimum signal level. The spatial zones may be defined, thus, by means of a set of geographical coordinates or rules as part of a map, or identification tags of cells (Cell-IDs) or sub-cells of the respective cellular communication network. The spatial zones can further be located around a hazardous area or point. The zones can also be defined and/or changed by an authority, such as a road traffic supervision authority. Such an authority may also well distribute the spatial zones to digital map providers or to network and/or service providers for including the respective information to their Location Based Service (LBS).

Examples for areas in which or for which a respective spatial zone can be defined include road crossings and/or surroundings thereof, road junctions and/or surroundings thereof, up- or downhill sections of roads, winding sections of traffic roads, zones with an increased possibility of extreme localized weather conditions, such as road lowerings or road sections inside forests, in which, for example the probability of road glaze and/or fog can be substantially increased.

The connected mode of the cellular communications network may be characterized in that a dedicated channel is allocated for the respective terminal, while for other terminals not being automatically operated in the connected mode only a so-called Random Access Channel (RACH) may suffice.

The localized information service can further be particularly fast and low in delay if the reflection entity is arranged in an association with a base station or eNodeB, i.e. in a radio access network. The closer the reflection entity is to the terminals, the less delay there is. Nonetheless, the reflection entity can also be provided within the core network of the cellular communication network or even outside of the network.

It is noted that the network upload message carries a suitable form of indicator, such that the communication network can recognize it as a message of the network upload type, i.e. destined to be reflected by a reflection entity. Such an indicator can be a server address (where it is noted that if the reflection entity is not the addressed server, then no server actually needs to exist at said address; in other words, the server address can be to a virtual server), or any other form or indicator suitable, such as a predetermined flag in the message header. It is equally possible that the lack of a predetermined piece of information identifies a network upload message, such as a lack of information in the address field of the message.

According to a further embodiment, a method is proposed for operating a system that provides a localized information service using an infrastructure of a cellular communication network, the system comprising: a service source terminal arranged for transmitting a network upload message to the cellular communication network, said network upload message comprising a payload part; and a reflection entity of said cellular communication network arranged for receiving said network upload message, for generating one or more reflection messages comprising said payload part, and for sending said one or more reflection messages to at least one service destination terminal that has a predetermined spatial relationship with said service source terminal, wherein a spatial zone is defined in the system, and wherein the method comprises automatically operating in a connected mode of the cellular communication network at least one of the service source terminal and the at least one service destination terminal that is inside the spatial zone.

According to a further embodiment, a network entity of a cellular communication network is provided comprising a receiver for receiving from a service source terminal a network upload message comprising a payload part, a message generator for generating one or more reflection messages comprising said payload part, and a message sender for sending said one or more reflection messages to at least one service destination terminal that has a predetermined spatial relationship with said service source terminal, wherein a spatial zone is defined and the network entity is arranged for automatically operating in a connected mode of the cellular communication network at least one of the service source terminal and the at least one service destination terminal that is inside the spatial zone.

According to yet another embodiment, a method of controlling such a network entity is provided that comprises a procedure for receiving from a service source terminal a network upload message comprising a payload part, a procedure for generating one or more reflection messages comprising said payload part, and a procedure for sending said one or more reflection messages to at least one service destination terminal that has a predetermined spatial relationship with said service source terminal, wherein a spatial zone is defined, and wherein the method comprises automatically operating in a connected mode of the cellular communication network at least one of the service source terminal and the at least one service destination terminal that is inside the spatial zone.

BRIEF DESCRIPTION OF THE DRAWINGS

Embodiments of the present invention, which are presented for better understanding the inventive concepts but which are not to be seen as limiting the invention, will now be described with reference to the Figures, in which:

FIGS. 1A and 1B show flowcharts of method embodiments of the present invention;

FIG. 2 shows a schematic representation of data reflection in a cellular communication network in which the present invention is applied;

DETAILED DESCRIPTION

Figure 1B:
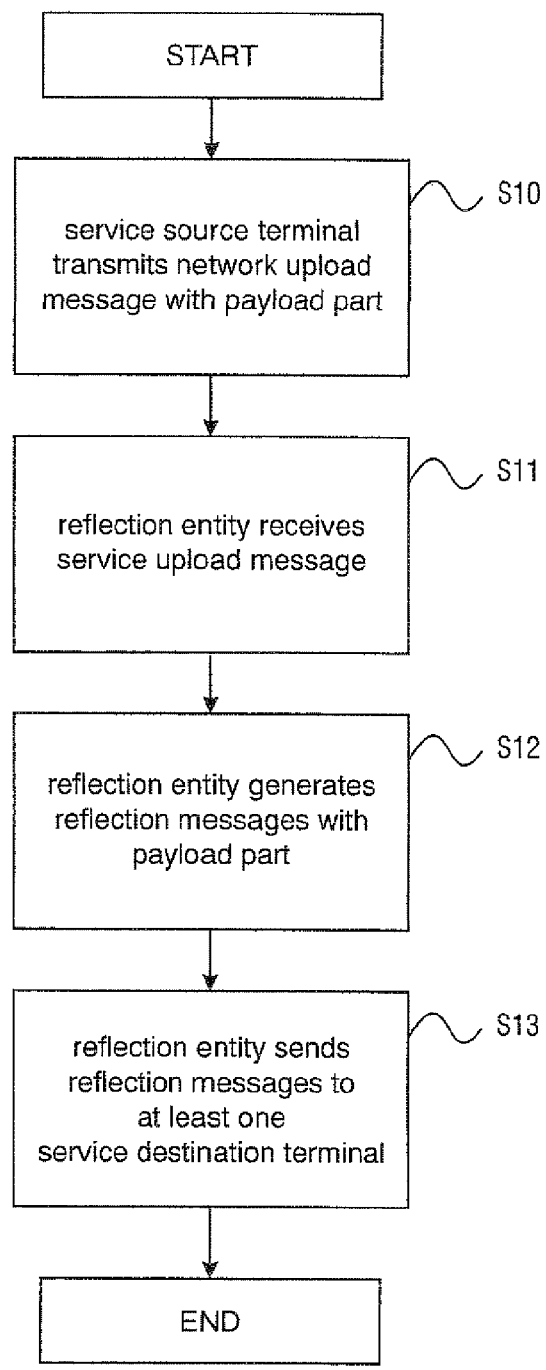

FIG. 1A shows a flowchart of a method embodiment of the present invention. In a first step S1, it is determined whether a service terminal, namely a service source terminal or a service destination terminal, is inside the spatial zone. The determination of step S1 may well also be effected upon the respective service terminal entering the spatial zone or upon being switched on or gaining network access while inside the spatial zone. In any way, reasons for a service terminal not being already automatically operated in the connected mode although inside the spatial zone may include the respective terminal just having entered or left the spatial zone or the terminal may also be limited by subscription, i.e. the enhanced quality of service is made only available to terminals that are subscribers to the respective service. Further details of step S1, in particular details on how and when it is determined that a respective terminal enters or is inside the spatial zone are described in conjunction with another embodiment of the present invention, in particular in conjunction with FIGS. 4A and 4B.

If it is determined that the respective service terminal is now inside the spatial zone (result "YES" of step S1), a login message is sent by the terminal in step 92. This may be effected to register onto fast data reflection. Subsequently, a connection is established and/or kept alive in step S3, which may include the reservation of a so-called dedicated channel (DCH) of the cellular communication network. In this way, at least one of the service source terminal and the at least one service destination terminal are operated in a connected mode. Such a connected mode of the cellular communication network may imply that messages can be sent from and received by the respective terminal with substantially reduced delay, since establishing a connected mode prior to sending and/or receiving any messages can be omitted.

As a consequence, fast data reflection may be possible now in step S4, since the respective terminal is already in a connected mode of the cellular communication network and transmitting of a network upload message and/or receiving a reflection message may take place with substantially reduced delay, i. e. fast. In an optional step S5, the respective terminal sends a logout message. This may be effected upon leaving the spatial zone or when the respective terminal is being switched off.

It is noted, however, that data reflection is also available to service terminals—both service source and service destination terminals—that are outside the spatial zone (step S4'). The only difference for these terminals is that a connected mode may need to be established first, but these terminals eventually are able to transmit and/or receive the upload message or the respective reflection message(s). Also, such terminals may transmit and/or receive messages in a loosely coupled way, for example, via a so-called random access channel (RACH), which may not require an establishing of a connected mode prior to message transfer.

In general, a service source terminal and/or a service destination terminal may perform hazard monitoring for determining whether to transmit a network upload message in a disconnected mode, spatial zone login upon entering a spatial zone, hazard monitoring in the connected mode of the cellular communications network, and logout upon leaving the spatial zone.

FIG. 1B shows a flowchart of a method embodiment of the present invention. Basically, steps S10 through S13 represent in greater detail steps S4 and S4' as described in conjunction with FIG. 1A. However, steps S10 through S13 may well be executed in parallel to steps S1 through S5, since data reflection may be effected while other terminals enter and/or leave the spatial zone.

In a first step S10, a terminal of a cellular communication network transmits a network upload message to the cellular communication network, where the upload message comprises certain content in a payload part.

The term "network upload message" means that the message is meant to be uploaded to the cellular communication network, but it also means that this is a specific message designed for the localized information service in that it comprises a suitable form of indicator, such that the cellular communication network can recognise it as being a message comprising a payload part that is to be reflected back to service destination terminals in a localized information service. The indicator can be chosen in any suitable or desirable way, e.g. it can be a predetermined string of data such as a server address, or it can be some other indicator, such as a flag in the header of the message.

The triggering of the network upload message transmission can also be chosen in any suitable or desirable way. For example, a message can be sent by a user of a mobile terminal by appropriately interacting with an application on the mobile terminal, or such a network upload message can also be sent automatically, e.g. in an emergency situation, in which it is desired to alert the surroundings of a potentially dangerous or hazardous situation. In this way, the concept of the present invention can advantageously be applied in the context of a vehicle-mounted system that is arranged to automatically send out a network upload message with a warning or alert content when a suitable detector in the vehicle recognises a dangerous situation, e.g. if an accident detector detects that an accident has occurred.

In step S11 a reflection entity in the cellular communication network receives the network upload message. It is noted that the term "entity" relates to a device or a group of devices for providing the indicated functionality. As such, a node, a node part or a group of nodes can form a network entity.

As indicated above, the network upload message carries a suitable indicator. The reflection entity is arranged for being able to recognise this indicator. This can be done in a variety of ways. For example, the indicator can simply be the address of a service that comprises the reflection entity, such that the network upload messages are forwarded by the network through the reflection entity. In this sense, the server automatically recognises the upload messages. However, it is also possible to e.g. arrange one or more nodes in the cellular communication network to parse messages for the indicator (e.g. a given server address), and to thus recognise and intercept the network upload messages. For example, the reflection entity can be located within a base station, and capable of detecting one or more given server addresses, to then directly perform a reflection operation, i.e. not actually forward the messages towards the indicated address. As can be seen, it is therefore not necessary in this case that a server under said given address actually exists. Equally, the network entity can be arranged to recognise an indicator like a flag in the message header.

In step S12 the reflection entity generates one or more reflection messages comprising the payload part received in the network upload message. For example, the payload part may comprise alert or warning information that the sending terminal wishes to distribute in a specific area around itself. The generation can e.g. comprise that the payload part of the message (which comprises a header with control information and a payload part with content) that is reflected remains untouched, only the header of the message is changed.

The determining which possible terminals should actually receive the reflection message(s) can be done in a variety of ways. For example, the reflection entity can perform or have performed a dedicated determination procedure for establishing the spatial relationship, e.g. by estimating the location of the sending terminal and then applying a specific rule (such as "find all terminals within a radius xy") based on estimated locations of terminals that are possible destinations for the information service.

However, the spatial relationship can also be determined implicitly, e.g. based on the location of the reflection entity itself. Namely, if the reflection entity is associated with a node of the cellular communication network that serves a predetermined area (such as a base station), then the spatial relationship can be established as sending the reflection messages to all terminals within said predetermined area, as it is the predetermined area in which the sending terminal is located. Naturally, the spatial relationship could also be defined as sending the reflection messages to terminals in not only the predetermined area (e.g. cell), but also to neighbouring predetermined areas within an area scheme of the cellular communication network (e.g. neighbouring cells).

It is noted that the localized information service can be provided in such a way that only terminals that are subscribers for a respective service are able to act as service source terminals and/or service destination terminals, or only terminals that are subscribers for a respective service are automatically operated in a connected mode while inside the spatial zone.

In step S13, the reflection entity sends the one or more reflection messages to the service destination terminals that have a predetermined spatial relationship with the service source terminal.

In case that a service source terminal is operated in said connected mode, this terminal can transmit the network upload message in step S10 without the need to establish a connected mode first, and, hence, can transmit the network upload message with reduced delay, i.e. very fast. In case the at least one service destination terminal is operated in said connected mode, this terminal can receive the reflection messages as sent by the network entity in step S13 with a substantially reduced delay, since neither the network entity nor the destination terminal itself needs to establish a connected mode at this instance. If, however, all involved service terminals, i.e. the service source terminal and all service destination terminals that are inside the spatial zone, are operated in the connected mode, data reflection can be performed very fast, since delays on the uplink-side as well as on the downlink-side are avoided.

FIG. 2 shows a schematic representation of data reflection according to an embodiment of the present invention. In this concept, a geographical area is covered by cells 301, 302 of a cellular communication network. This geographical area may comprise a road on which several traffic members travel in different directions. These traffic members may hold service source terminals and/or service destination terminals which can be identified, for the shown example, as a service source terminal 10, and service destination terminals 11, 19.

The concept of data reflection within a cellular communication network firstly involves transmitting of a network upload message by service source terminal 10 that is involved and/or has become aware of a road traffic hazard, such as an incident or a trail of a traffic jam. Once the service source terminal 10 has detected the occurrence of such a road traffic hazard—or any other event that is due to trigger the sending of a respective network upload message, the service source terminal 10 transmits such a network upload message 40 to the cellular communication network, wherein said upload message 40 comprises some form of a payload part. Said payload part may, for example, indicate the type of reason why the network upload message 40 has been transmitted, such as information on the specific hazard event.

A base station 30 of the cellular communication network, such as a node or a so-called "eNodeB" or "NodeB", receives the network upload message 40 and forwards this message to a reflection entity 31. This reflection entity 31 is arranged for receiving the network upload message 40 and for generating one or more reflection messages 41 comprising said payload part. Further, the reflection entity 31 is arranged for sending said one or more reflection messages 41 to at least one service destination terminal that has a spatial relationship with the service source terminal 10, such as the service destination terminal 11.

By way of example, FIG. 2 depicts a situation in which the spatial relationship is defined by means of the cell 302 of the cellular communication network. In this way, only the service destination terminal 11 receives the reflection message 41, whereas the service destination terminal 19, that is outside the cell 302 does not receive said reflection message.

Further, the definition of the spatial relationship by means of the cells of the cellular communication network may be induced by the fact that the respective cells 301, 302 are sufficiently large, such that any service destination terminal that is located outside a respective cell, such as the cell 302, is not immediately affected by the respective event from which the network upload message originates. If the cells 301, 302 are sufficiently large, it may suffice that service destination terminal 19 only receives the reflection message 41 upon reaching or entering the cell 302 from cell 301, hence, reaching the same spatial relationship with the service source channel 10. The spatial relationship may, in general, also consider the case that two respective terminals are on a co-called collision course, indicating that the spatial relationship may be characterized in that a service destination terminal is moving toward the service source terminal, implying that events that have affected the source terminal will also soon affect the respective destination terminal.

It is noted, however, that the spatial relationship needs not to be defined in conjunction with cells or other spatial units of the cellular communication network, and can also be entirely independent from any spatial units of the network. For example, all involved terminals may provide positional information, obtained, for example, from satellite or earth bound positioning signals, to the network entity 31, which, as a consequence, may be able to independently and autonomously calculate whether two terminals qualify for the predetermined spatial relationship.

The forwarding of the messages, i.e. the network upload messages 40 and/or the reflection messages 41 from the base station 30 to the reflection entity 31, may include forwarding of the respective messages between a Radio Network Controller 39, a Serving GPRS Support Node 38, a Gateway GPRS Support Node 37, a BM-SC 36, a Cell Broadcast Centre 35, and/or a Mobile Positioning System 34.

Figure 3A:
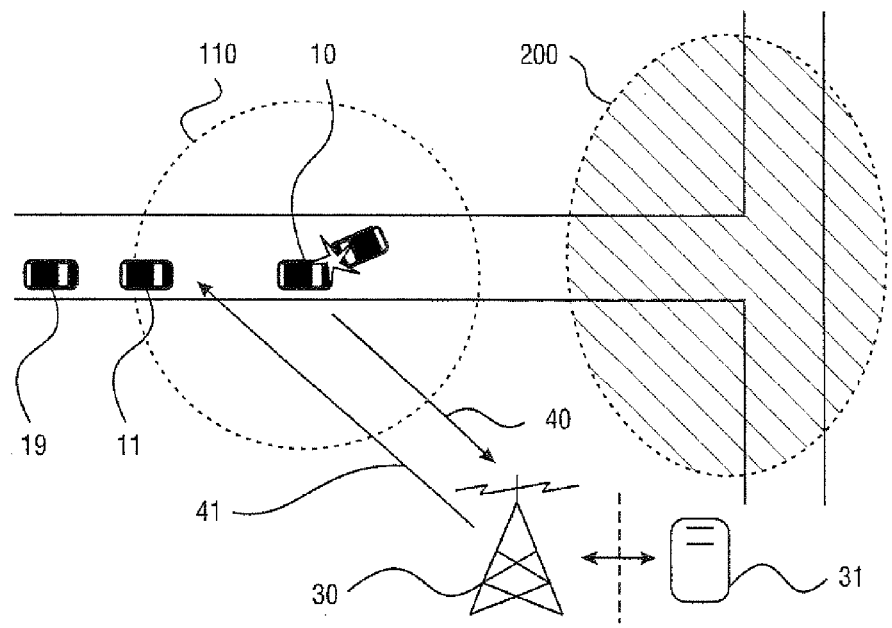
FIGS. 3A through 3C show schematic representations of several scenarios of spatial zones according to embodiments of the present invention.

FIG. 3A shows a first scenario within a cellular communications network according to an embodiment of the present invention. Accordingly, a service source terminal 10 sends a network upload message 40 to a base station 30 of the cellular communications network, and a reflection entity 31 receives said upload network message 40 and generates at least one reflection message 41 for sending this message via the base station 30 to the service destination terminal 11 which has a spatial relationship 110 with the service source terminal 10.

As long a further service destination terminal 19 is still outside the spatial relationship 110 with the service source terminal 10, this terminal 19 does not receive the reflection message 41 from the base station 30 and/or the reflection entity 31. It may, however, receive a reflection message 41 from the reflection entity 31 once it enters the spatial relationship 110 with the service source terminal 10.

Further, a spatial zone 200 is defined which covers, for example, a road crossing on which vehicle mounted service terminals 10, 11, and 19 move and travel along. According to this scenario, the service destination terminals that are outside the spatial zone but have the spatial relationship 110 with the service source terminal 10, such as the service destination terminal 11, still receive the reflection messages from the reflection entity 31. In this way, data reflection is, in principle, independent from the spatial zone 200 and is fully operable also outside the spatial zone 200, and also entirely independent therefrom.

Figure 3B:
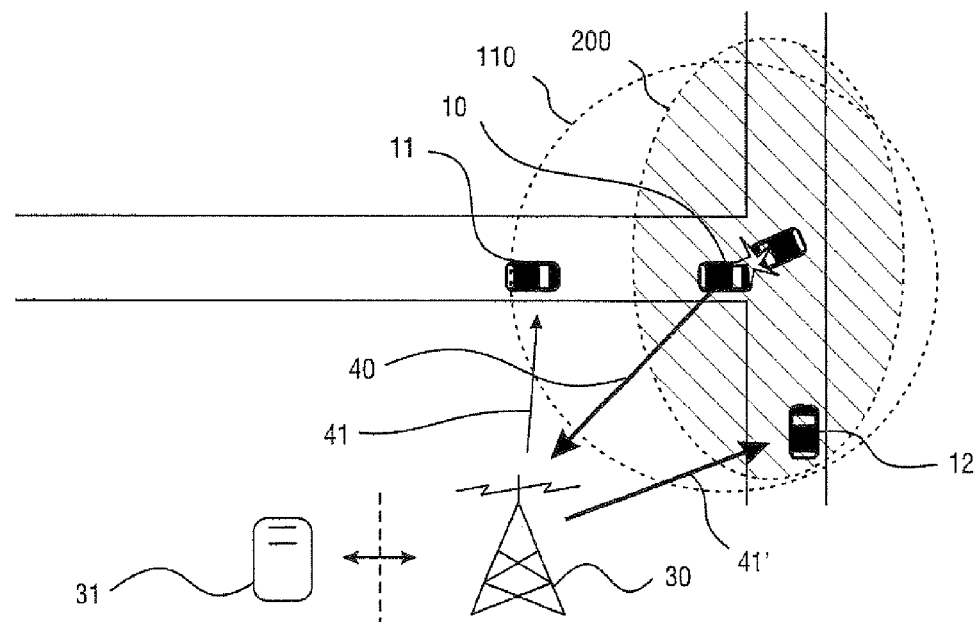

FIG. 3B shows a further scenario within the cellular communication network according to an embodiment of the present invention. According to this scenario, the service source terminal 10 and a further source destination terminal 12 are inside the spatial zone 200. Accordingly, both the service source terminal 10 and the service destination terminal 12 are automatically operated in a connected mode of the cellular communication network.

As a consequence, the service source terminal 10, at the instance of transmitting the network upload message 40 upon detecting a road traffic hazard or a related event, is already in a connected mode of the cellular communication network and, hence, is able to transmit the network upload message 40 to the reflection entity 31 with a substantially reduced delay. Further, since the service destination terminal 12 is also located inside the spatial zone 200, it is also automatically operated in the connected mode at the instance when the reflection entity 31 sends the reflection messages 41, 41' to all service destination terminals that have a spatial relationship 110 with the service source terminal 10. In this way, the service destination terminal 12 receives the reflection message 41' also with a substantially reduced delay. As a consequence, the transmission delay from originating a network upload message to receiving a respective reflection message is minimized in the case all involved terminals, such as the service source terminal 10 and the service destination terminal 12 are inside the spatial zone 200, and are automatically operated in a connected mode.

Further, data reflection is also available to other service destination terminals, such as the service destination terminal 11, which has a spatial relationship 110 with the service source terminal 10, but is outside the spatial zone 200. In case of the service destination terminal 11, however, it may be required to establish a connection mode prior to sending and receiving the reflection message 41 from the reflection entity 31, or the service destination terminal 11 may receive the reflection message 41 in a loosely coupled way, for example, via a so-called random access channel (RACH) on which all terminals continuously listen for incoming messages. Message reception via such a RACH may be, however, slower than via a so-called dedicated channel (DCH) while as part of a connected mode.

Nevertheless, although with a slightly longer delay than compared to the service destination terminal 12, also the service destination terminal 10 receives the reflection message 41 and has access to data reflection. In other words, the reflection message 41' reaches the service destination terminal 12 faster than the reflection message 41 reaches the terminal 11.

Figure 3C:
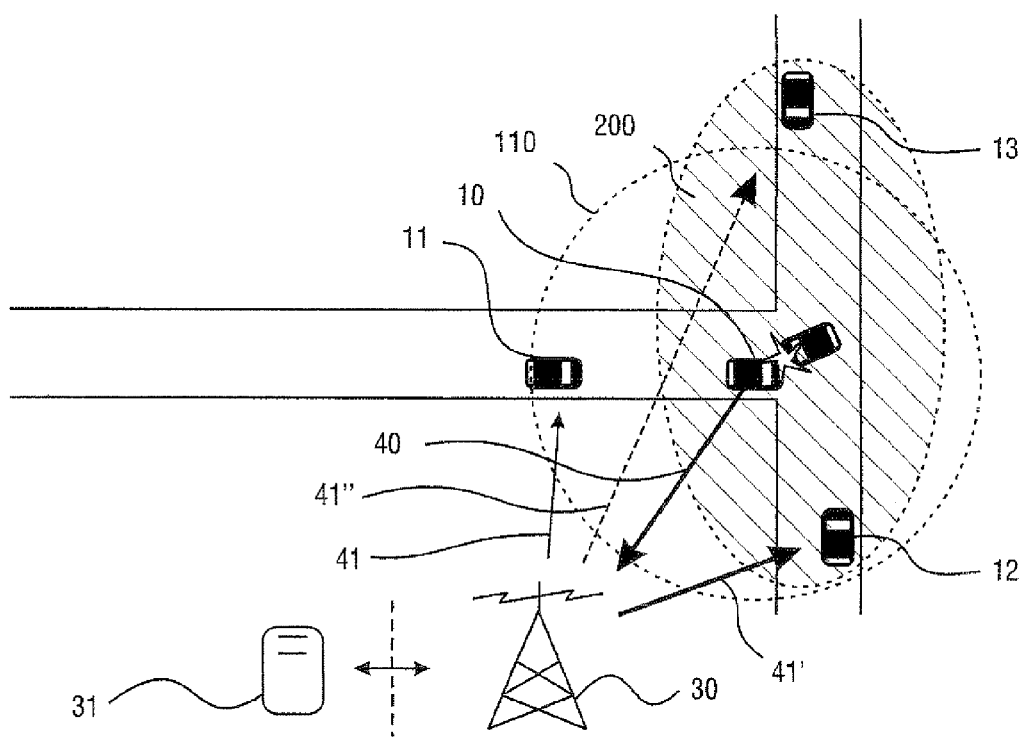

FIG. 3C shows another scenario within the cellular communication network according to an embodiment of the present invention. Accordingly, a third service destination terminal 13 is inside the spatial zone 200, but has no spatial relationship 110 with the service source terminal 10. In this case, the third service destination terminal 13 is automatically operated in a connected mode of the cellular communication network, and, hence, is able to receive reflection messages from the reflection entity 31 by a substantially reduced delay. However, since the third service destination terminal 13 has no spatial relationship 110 with the service source channel 10, it may not receive any reflection messages from the reflection entity 31 until it reaches the spatial relationship 110.

In such a situation, however, the third service destination terminal 13 is already in a connected mode and, hence, also receives a reflection message from the reflection entity 31 with a reduced delay, since at the instance of entering the spatial relationship 110 with the service source terminal 10 a connected mode of the cellular communication network has already been established.

As a further alternative, the spatial relationship 110 may also be automatically extended to the spatial zone 200 in the way that all service destination terminals that have the spatial relationship 110 with the service source terminal 10 and/or are inside the spatial zone 200 receive respective reflection messages from the reflection entity 31. In this way, the service destination terminal 13 may receive immediately the reflection message 41" as fast as the destination terminal 12 receives message 41', although not having the spatial relationship 110 with the source terminal 10, but being inside the spatial zone 200. In other words, the service destination terminal 13 receives the reflection message 41" faster than the terminal 11 receives the message 41. In this way, a further localized acceleration of data transmission and data reflection may be effected.

In general, the definition of spatial zones in which service source terminals and/or service destination terminals are automatically operated in a connected mode provides enhanced quality of service, i.e. faster transmission of network upload messages and/or faster reception of reflection messages, respectively, while still keeping the necessary load to the cellular communication network to acceptable levels. The latter levels may specify, for example, maximum load conditions or congestion conditions of the cellular communication network.

However, since establishing and maintaining the connected mode is restricted only to the selected areas of the spatial zones, increased radio and processing resource demand is, as a consequence, also restricted to the terminals within these zones. Outside the spatial zones network load is not increased at all, since data reflection involves resources only when respective messages are sent or, accordingly, reflected. In this way, the quality of service is—as a whole— substantially improved while substantially reducing system load with respect to simply operating all terminals in a connected mode. This can be accompanied by limiting and/or varying the number of spatial zones. As an example, some of the spatial zones may only be defined in conjunction with special events, such as initial days of regional or national holidays or actual weather conditions, or special time windows, such as peak hours and the like. Moreover, scalability can be ensured by mapping the spatial zones to specific reflection entities.

Figure 4A:
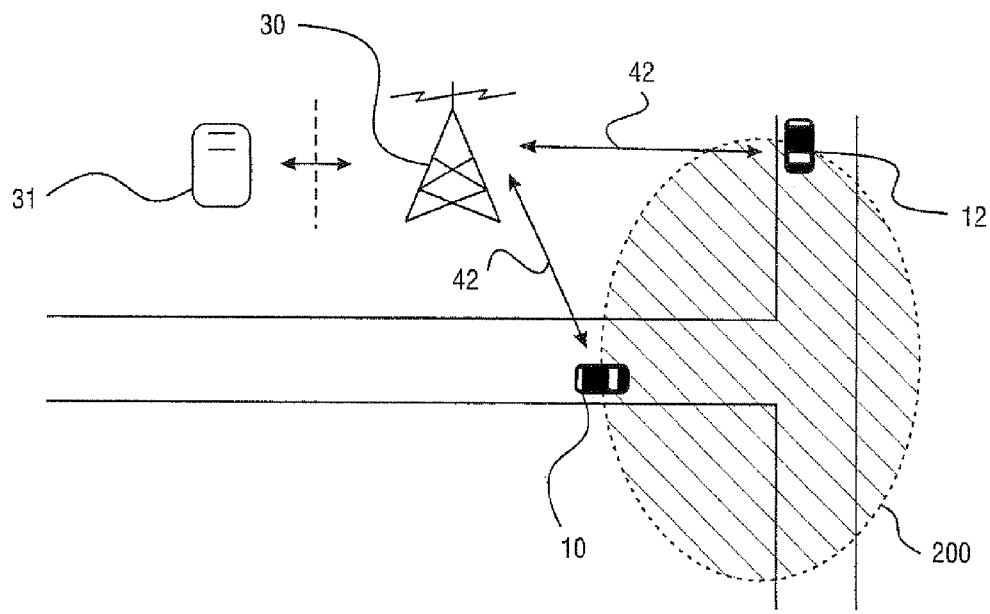
FIGS. 4A through 4C show schematic representations of terminals entering, being inside, and leaving the spatial zone according to an embodiment of the present invention.

FIG. 4A shows a scenario of entering the spatial zone 200 within a cellular communication network according to an embodiment of the present invention. As shown in FIG. 4A, two terminals, such as the service source terminal 10 and the service destination terminal 12 enter the spatial zone 200. At respective instances, the service source terminal 10 sends a login message 42 via the base station 30 to the reflection entity 31 and the service destination terminal 12 sends a corresponding login message 42 via the base station 30 to the reflection entity 31. The login messages 42 indicate to the system that the service source terminal 10 and/or the service destination terminal 12 have entered the spatial zone 200 and are, onwards, to be automatically operated in a connected mode of the cellular communication network.

The login messages 42 from the terminals 10, 12 may be initiated by the terminals 10, 12 themselves, in the way that these terminals detect entry into the spatial zone 200 by means, for example, receiving respective positioning information. Such positioning information may originate, for example, from a Global Positioning System (GPS) or a Galileo system, and may be compared to a digital map in which the spatial zones 200 are defined. Further, the terminals may well receive ground-based positional signals such as a zone beacon that can well originate also from entities of the cellular communication network, such as the reflection entity 31.

Such a zone beacon may further be part of a broadcast signal or of an independent radio signal, and determination whether the terminals 10, 12 enter the spatial zone 200 may be based on reception levels of the respective signals or broadcast messages. In addition to this, the terminals may also determine the entering of the spatial zone 200 by means of a cell change or handover procedure. Anyways, the respective positional information may indicate to the terminals 10, 12 that they are now entering or inside the spatial zone 200. The beacon signal may also comprise information that specifies the respective spatial zone 200. In this way, the terminals may not only determine that they are now inside a spatial zone but may also be able to foresee when and where to leave the zone again.

Transmitting the login message 42 and/or the login message 42 itself may comprise data specific for the spatial zone, which may provide general information to a user, such as regularly occurring hazards in the respective area, such as rear-end collisions or slippery road conditions.

Figure 4B:
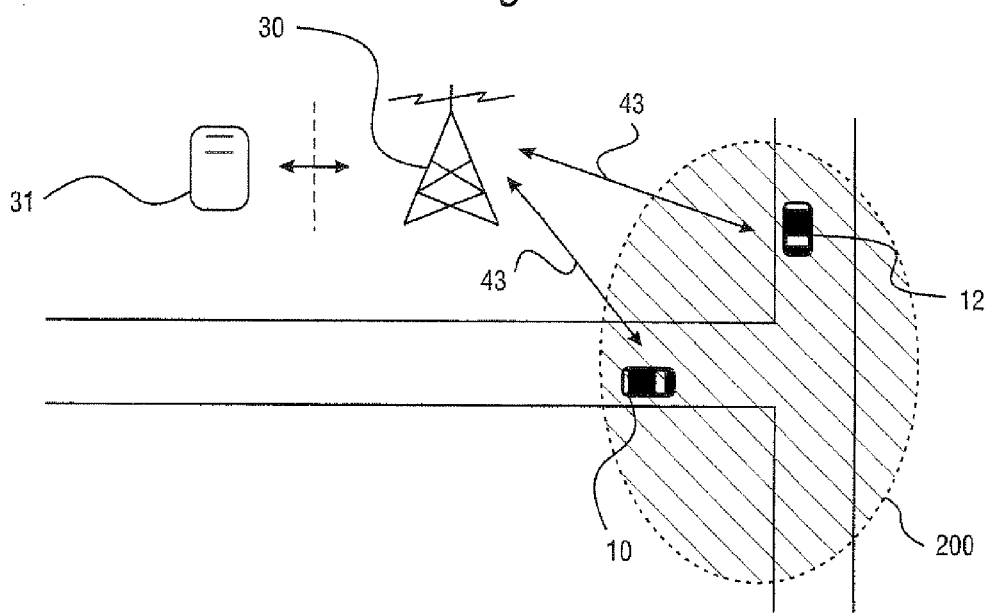

FIG. 4B shows another scenario within a cellular communication network according to an embodiment of the present invention. Accordingly, the service source terminal 10 and the service destination terminal 12 are already inside the spatial zone 200. Since the system comprises automatically operating the terminals that are inside the spatial zone 200 in a connected mode of the cellular communication network, this connected mode may need to be maintained. Maintaining the terminals 10, 12 in the connected mode while they are inside the spatial zone 200 may be effected by exchanging keep-alive messages 43 between the service terminals 10, 12 and the radio station 30 and/or the reflection entity 31. Said keep-alive messages 43 may be initiated from the terminals 10, 12 or from the network side via the base station 30 and/or the reflection entity 31. The connected mode may further comprise a maintaining of a radio and/or link layer connection. In case the keep-alive messages 43 are equipped with recent positional information of the originating terminal 10, 12, the reflection entity 31 can be made aware of the actual position status of all terminals within its area of responsibility, such as the spatial zone 200 and/or the spatial relationship 110. In this way, the determination of a spatial relationship can be executed without further delay, i.e. very fast.

The above described sending of the keep-alive messages 43 may as such allocate radio resources and maintain the connected mode between the reflection entity 31 and the respective terminal 10, 11, 12, and 19. In this way, no further mechanism needs to be established for implementing an automatic operation in the connected mode. Further, the terminals 10, 11, 12, and 19 may be rendered responsible for maintain the connected mode in repeatedly sending out the keep-alive messages 43 while being inside the spatial zone 200.

Figure 4C:
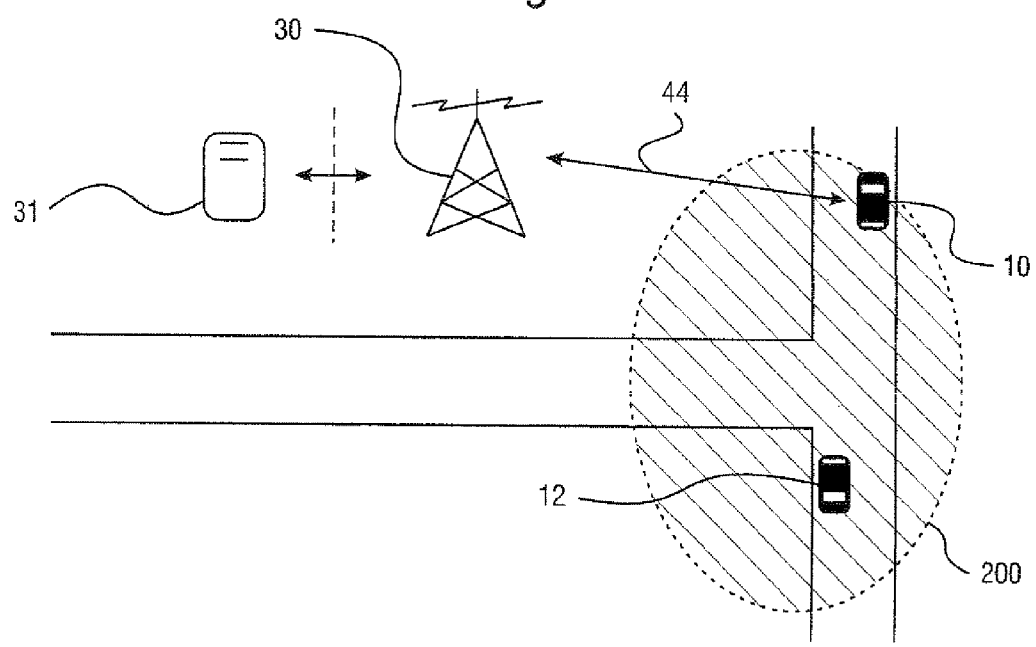

FIG. 4C shows a further scenario within the cellular communication network according to an embodiment of the present invention. Accordingly, one of the service terminals, namely terminal 10 leaves the spatial zone 200, and, accordingly sends a logout message 44 to the base station 30 and/or the reflection entity 31. From this instance on, the automatically operating in a connected mode of the cellular communication network ceases for the respective service terminal 10.

The trigger for sending said logout message 44 may be again determined by receiving respective positional information and comparing this information to a digital map in which the spatial zone 200 is defined, or by determining that the reception level of a zone beacon signal falls below a predetermined threshold value. Further, a fading reception of a broadcast signal of the cellular communication network or a cell change procedure may trigger sending the logout message 44. However, even if outside the spatial zone 200 and not necessarily being operated in a connected mode of the cellular communication network, data reflection may still be available to the terminal 10 once having left the spatial zone 200 but having a spatial relationship to any other service source terminal that transmits a respective network upload message.

The leaving of the spatial zone 200 by terminal 10 may also be determined in that the respective terminal ceases to transmit above keep-alive messages 43 for at least a predetermined time interval. In this way, the reflection entity 31 may determine that the terminal 10 has left the spatial zone 200 or has been switched off, such that automatic operation in the connected mode is no longer necessary and/or the transmitting and receiving of the logout message 44 becomes obsolete.

Further, transmitting the login message 42 and/or the logout message 44 or the respective messages themselves may comprise additional information that can be used for further driver assistant systems, such as navigational systems or road crossing assistants. Also, the additional information may comprise specific information on the event that has triggered transmitting of the network upload message, which renders possible further advantages for driver assistant systems. The additional information may further comprise information elements such as the vehicle ID, a location reference, speed, acceleration, route information, intended driving directions, etc. The reflection entity 31 may further send a response message to any login, kepp-alive, and/or logout message 42, 43, 44 to a terminal, that may comprise general zone information, such as an ID, traffic load, status information, a permission indicator, a number of connected vehicles, hazard type information, and the like. Such information may be used by terminal-side applications to adapt their respective behaviour.

In general, however, the automatic operation of the terminals in the connected mode may be independent from transmitting any login, keep-alive, or logout messages. In this way, the automatic operation of the terminals in the connected mode of the cellular communications network may be triggered by the terminal or by the network. The reflection entity can, therefore, compare positional information of a terminal to digital map data that define the spatial zone, and, upon determining that a respective terminal is inside a spatial zone initiate automatic operation in the connected mode of the respective terminal. Further, the terminal can decide, for example upon receiving the above-described zone beacon, to now automatically operate in the connected mode.

Embodiments of the invention can improve the delay performance of localized information services in a cellular network (reduces transmission latencies) and enable thereby novel applications, like effective and fast road traffic hazard warnings, i.e. vehicles are able to warn vehicles in the proximity on accidents, critical driving situations, slippery road conditions, etc.

Although detailed embodiments have been described, these only serve to provide a better understanding of the invention defined by the appended claims, and are not to be seen as limiting.

The invention claimed is:

1. A system for providing a localized information service using an infrastructure of a cellular communication network, the system comprising:
   a service source terminal configured to transmit a network upload message to the cellular communication network, the network upload message comprising a payload part;
   a reflection entity of the cellular communication network configured to:
      receive the network upload message;
      generate one or more reflection messages comprising the payload part;
      send the one or more reflection messages to at least one service destination terminal that has a predetermined spatial relationship with the service source terminal;
   wherein a geographical zone is defined as a spatial zone;
   wherein the system is configured to automatically operate a first terminal in a connected mode of the cellular communications network when the first terminal is inside the spatial zone, the first terminal being one of the service source terminal and the at least one service destination terminal;
   wherein the system if further configured to automatically bring the first terminal into the connected mode in response to entry of the first terminal into the spatial zone.

2. The system of claim 1 wherein the first terminal is configured to detect entry into the spatial zone based upon receiving a zone beacon from the cellular communication network.

3. The system of claim 2 wherein the reflection entity is further configured to send out the zone beacon.

4. The system of claim 1 wherein the first terminal is configured to detect entry into the spatial zone based on positional information and zone information of a digital map.

5. The system of claim 1 wherein the first terminal is configured to send a login message to the reflection entity upon entering the spatial zone.

6. The system of claim 1 wherein the system is configured to keep the first terminal in the connected mode while the first terminal is inside the spatial zone.

7. The system of claim 1 wherein the first terminal is configured to maintain the connection mode and allocate radio resources by sending out a keep-alive message while inside the spatial zone.

8. The system of claim 1 wherein the system is configured to release the first terminal from the connected mode upon the first terminal leaving the spatial zone.

9. The system of claim 8 wherein the first terminal is configure to switch to a disconnected mode by sending out a logout message upon leaving the spatial zone.

10. The system of claim 1 wherein the service source terminal is configured to automatically detect a hazard event and, in response thereto, automatically transmit the network upload message.

11. The system of claim 1 wherein the first terminal is vehicle mounted.

12. The system of claim 1 wherein the spatial zone marks a road traffic hazard zone on a digital map.

13. The system of claim 1 wherein the reflection entity is configured to send the one or more reflection messages to the at least one service destination terminal over a broadcast channel or multicast channel of the cellular communication network.

14. The system of claim 1 wherein the reflection entity is further configured to perform a spatial relationship determination procedure for determining a group of service destination terminals.

15. The system of claim 1 wherein the reflection entity is associated with a node of the cellular communication network that serves a predetermined area.

16. The system of claim 15 wherein the reflection entity is located at a base station of the cellular communication network.

17. The system of claim 1 wherein the reflection entity is configured to perform a message anonymization procedure for omitting information identifying the service source terminal from the one or more reflection messages.

18. A method for providing a localized information service using an infrastructure of a cellular communication network, the method comprising:
  providing a system comprising:
    a service source terminal configured to transmit a network upload message to the cellular communication network, the network upload message comprising a payload part;
    a reflection entity of the cellular communication network configured to:
      receive the network upload message;
      generate one or more reflection messages comprising the payload part;
      send the one or more reflection messages to at least one service destination terminal that has a predetermined spatial relationship with the service source terminal;
    wherein a geographical zone is defined in the system as a spatial zone;
  automatically operating a first terminal in a connected mode of the cellular communication network when the first terminal is inside the spatial zone, the first terminal being one of the service source terminal and the at least one service destination terminal;
  automatically bringing the first terminal into the connected mode in response to entry of the first terminal into the spatial zone.

19. The method of claim 18 further comprising the first terminal detecting entry into the spatial zone based upon receiving a zone beacon from the cellular communication network.

20. The method of claim 18 further comprising the first terminal detecting entry into the spatial zone based on positional information and zone information of a digital map.

21. The method of claim 18 further comprising the first terminal sending a login message to the reflection entity upon entering the spatial zone.

22. The method of claim 18 further comprising the first terminal maintaining the connection mode and allocating radio resources by sending out a keep-alive message while inside the spatial zone.

23. The method of claim 18 further comprising releasing the first terminal from the connected mode upon the first terminal leaving the spatial zone.

24. The method of claim 23 further comprising the first terminal switching to a disconnected mode by sending out a logout message upon leaving the spatial zone.

25. The method of claim 18 further comprising the service source terminal automatically detecting a hazard event and, in response thereto, automatically transmitting the network upload message.

26. The method of claim 18 further comprising sending the one or more reflection messages over a broadcast channel or multicast channel of the cellular communication network.

27. The method of claim 18 further comprising the reflection entity performing a spatial relationship determination procedure for determining a group of service destination terminals.

28. The method of claim 18 wherein the reflection entity is associated with a node of the cellular communication network that serves a predetermined area.

29. The method of claim 18 further comprising the reflection entity performing a message anonymization procedure for omitting information identifying the service source terminal from the one or more reflection messages.

30. A network entity of a cellular communication network, comprising:
  a receiver for receiving from a service source terminal a network upload message comprising a payload part;
  a message generator for generating one or more reflection messages comprising the payload part, and
  a message sender for sending the one or more reflection messages to at least one service destination terminal that has a predetermined spatial relationship with the service source terminal,
  wherein a geographical zone is defined as a spatial zone;
  wherein the network entity configured to automatically operate at first terminal in a connected mode of the cellular communication network when the first terminal is inside the spatial zone, the first terminal being one of the service source terminal and the at least one service destination terminal;
  wherein the network entity is further configured to bring the first terminal into the connected mode in response to entry of the first terminal into the spatial zone.

31. A method of controlling a network entity, the method comprising:
  receiving, from a service source terminal, a network upload message comprising a payload part;
  generating one or more reflection messages comprising the payload part;
  sending the one or more reflection messages to at least one service destination terminal that has a predetermined spatial relationship with the service source terminal;
  wherein a geographical zone is defined in the system as a spatial zone;
  automatically operating a first terminal in a connected mode of the cellular communication network when the first terminal is inside the spatial zone, the first terminal being one of the service source terminal and the at least one service destination terminal;
  automatically bringing the first terminal into the connected mode in response to entry of the first terminal into the spatial zone.

32. A computer program product stored in a non-transient computer readable medium for controlling a programmable network entity in a cellular communication network, the computer program product comprising software code instructions which, when run on the network entity, causes the programmable network entity to:
  receive, from a service source terminal, a network upload message comprising a payload part;
  generate one or more reflection messages comprising the payload part;

send the one or more reflection messages to at least one service destination terminal that has a predetermined spatial relationship with the service source terminal;

wherein a geographical zone is defined in the system as a spatial zone;

automatically operate a first terminal in a connected mode of the cellular communication network when the first terminal is inside the spatial zone, the first terminal being one of the service source terminal and the at least one service destination terminal;

automatically bring the first terminal into the connected mode in response to entry of the first terminal into the spatial zone.

\* \* \* \* \*

UNITED STATES PATENT AND TRADEMARK OFFICE
CERTIFICATE OF CORRECTION

PATENT NO. : 8,831,604 B2  
APPLICATION NO. : 13/391003  
DATED : September 9, 2014  
INVENTOR(S) : Gehlen et al.

Page 1 of 1

It is certified that error appears in the above-identified patent and that said Letters Patent is hereby corrected as shown below:

In the Specification

In Column 1, Line 34, delete "(MEMS)" and insert -- (MBMS) --, therefor.

In Column 3, Line 61, delete "(CPRS)," and insert -- (GPRS), --, therefor.

In Column 3, Line 65, delete "(MEMS)," and insert -- (MBMS), --, therefor.

In Column 6, Line 13, delete "step 92." and insert -- step S2. --, therefor.

Signed and Sealed this  
Twenty-fifth Day of August, 2015

Michelle K. Lee  
*Director of the United States Patent and Trademark Office*